United States Patent
Collet

(10) Patent No.: US 9,457,305 B2
(45) Date of Patent: Oct. 4, 2016

(54) HOUSEHOLD APPLIANCE FOR IRONING WITH A FILTER FOR RETAINING MINERAL PARTICLES CARRIED BY THE STEAM

(71) Applicant: SEB S.A., Ecully (FR)

(72) Inventor: Frederic Collet, Vienne (FR)

(73) Assignee: SEB S.A., Ecully (FR)

( * ) Notice: Subject to any disclaimer, the term of this patent is extended or adjusted under 35 U.S.C. 154(b) by 116 days.

(21) Appl. No.: 14/481,388

(22) Filed: Sep. 9, 2014

(65) Prior Publication Data

US 2015/0068170 A1 Mar. 12, 2015

(30) Foreign Application Priority Data

Sep. 10, 2013 (FR) ...................................... 13 58697

(51) Int. Cl.
| | |
|---|---|
| *D06F 75/16* | (2006.01) |
| *B01D 46/00* | (2006.01) |
| *D06F 75/10* | (2006.01) |
| *D06F 75/20* | (2006.01) |

(52) U.S. Cl.
CPC ........... *B01D 46/0002* (2013.01); *D06F 75/10* (2013.01); *D06F 75/16* (2013.01); *D06F 75/20* (2013.01)

(58) Field of Classification Search
CPC ....... A16H 33/12; D06F 75/06; D06F 75/08; D06F 75/12
USPC ....... 55/385.1; 38/77.6, 74, 77.3, 77.4, 77.5, 38/77.7, 77.8, 93; 219/245, 247, 248; 392/386, 394, 400, 401, 404, 405, 406
See application file for complete search history.

(56) References Cited

U.S. PATENT DOCUMENTS

| | | | |
|---|---|---|---|
| 4,057,918 A * | 11/1977 | Zeier ....................... | D06F 75/18 38/77.3 |
| 6,212,332 B1 * | 4/2001 | Sham ....................... | D06F 75/12 38/77.6 |

FOREIGN PATENT DOCUMENTS

| | | |
|---|---|---|
| EP | 0711862 A1 | 5/1996 |
| FR | 2981371 A1 | 4/2013 |

* cited by examiner

*Primary Examiner* — Duane Smith
*Assistant Examiner* — Minh-Chau Pham
(74) *Attorney, Agent, or Firm* — The Webb Law Firm

(57) ABSTRACT

Iron containing a steam generator connected to steam outlet holes by a steam conduit with at least one filter for retaining mineral particles carried by the steam, wherein the steam conduit has a mineral deposit collection cavity with a mineral deposit removal orifice closed by a detachable plug that is accessible from outside the iron, and wherein the filter can be detached from the iron through the mineral deposit removal orifice.

15 Claims, 3 Drawing Sheets

HOUSEHOLD APPLIANCE FOR IRONING WITH A FILTER FOR RETAINING MINERAL PARTICLES CARRIED BY THE STEAM

CROSS REFERENCE TO RELATED APPLICATION

This application claims priority to French Patent Application No. 1358697 filed Sep. 10, 2013, the disclosure of which is hereby incorporated in its entirety by reference.

FIELD OF THE INVENTION

This invention pertains to an iron with a flash boiling chamber connected to steam outlet holes by a steam conduit that contains a filter for retaining at least a portion of the mineral particles carried by the flow of steam.

DESCRIPTION OF RELATED ART

There already exists, as described in patent application FR 2 979 924 filed by the applicant, an iron containing a steam conduit connecting a flash boiling chamber to steam outlet holes placed in the soleplate of the iron. In that document, the steam conduit has a filter for retaining the mineral particles carried by the flow of steam to the boiling chamber outlet.

Such an iron has the advantage of retaining the largest mineral particles upstream of the filter, thereby preventing them from being transferred through the steam outlet holes of the soleplate and staining the fabric.

However, such an iron presents the disadvantage of having its performance, and in particular the steam output through the soleplate, diminished over time due to the gradual clogging of the filter and the scaling of the boiling chamber. This clogging occurs even more quickly the higher the degree of filtration, which is to say that the filter retains the smallest mineral particles.

Consequently, one objective of this invention is to provide an iron that remedies these disadvantages.

SUMMARY OF THE INVENTION

To this end, the invention pertains to an iron with a steam generator connected to steam outlet holes by a steam conduit with at least one filter for retaining mineral particles carried by the flow of steam, characterized in that the steam conduit has a mineral deposit collection cavity with a mineral deposit removal orifice that is closed by a detachable plug, which is accessible from the outside of the iron, and in that the filter can be detached from the iron through the mineral deposit removal orifice.

The iron thus created offers the advantage of having a mineral deposit removal orifice that can be used to both remove the mineral particles present in the steam conduit and to remove the filter so that it can be inspected and cleaned if necessary.

According to one characteristic of the invention, the filter is attached to the plug.

Such a characteristic provides a filter that is automatically pulled out of the device when the plug is removed, allowing the user to systematically inspect the condition of the filter when performing a cleaning.

Such a characteristic also reduces the number of steps that the user must perform in order to access the filter and prevents the user from forgetting to replace the filter after cleaning.

According to another characteristic of the invention, the filter consists of a screen with openings of less than 0.4 mm on a side.

Such a characteristic allows only mineral particles that are essentially invisible to pass through toward the steam outlet holes.

According to another characteristic of the invention, the steam moving through the steam conduit flows from bottom to top through the filter, the mineral collection cavity being positioned just upstream of the filter.

Such a characteristic offers the advantage of holding the particles against the lower surface of the filter, such that these particles detach from the filter due to gravity when the flow of steam stops, and they fall into the mineral collection cavity.

According to another characteristic of the invention, the filter is positioned in a portion of the steam conduit at the point where the flow of steam makes at least a 90° turn.

Such a characteristic offers the advantage of slowing the soiling of the filter, as the heaviest particles are carried, due to their inertia, out of the filter, into a gathering area.

According to another characteristic of the invention, the filter has a domed shape.

Such a characteristic offers the advantage of causing the water droplets to run along the domed shape of the filter, this runoff of water droplets offering the advantage of carrying away a portion of the mineral particles stuck to the filter, thus helping to clean it.

According to another characteristic of the invention, the filter has a container that is inserted in the mineral collection cavity through the mineral deposit removal orifice.

Such a characteristic offers the advantage of allowing for the removal of the mineral deposits by simply pulling out the mineral deposit collection container.

According to another characteristic of the invention, the mineral deposit collection container has an open front end, through which the steam enters, and a closed back end, while the container has a side window through which the steam exits in the direction of the steam outlet holes, the filter extending through the window.

Such a characteristic offers the benefit of the carrying effect of the steam flow moving through the container to increase the quantity of mineral deposits gathered in the container, the particles being trapped inside the mineral deposit collection container by the filter.

According to another characteristic of the invention, the mineral deposit collection container supports an airtight seal that comes into contact with the mineral deposit collection cavity, on either side of the window.

According to another characteristic of the invention, the window is oriented upward when the mineral deposit collection container is positioned in the mineral deposit collection cavity and the iron is in a normal operating position, the mineral deposit collection container having, on the wall opposite the window, a bowl with a hollowed portion.

According to another characteristic of the invention, the mineral deposit collection container has at least one part extending behind the filter, defining a storage space.

Such a characteristic offers the advantage of storing mineral particles in an area that is apart from the filter when the iron is positioned such that the container is oriented roughly vertically with the closed back end on the bottom.

Ideally, the storage space in the mineral deposit collection container is larger than 4 cm$^3$.

Such a characteristic makes it possible to gather the mineral particles accumulated between two supports, as well as the liquid water in the boiling chamber, without soiling the filter.

According to another characteristic of the invention, the steam generator is a flash boiling chamber.

Such a characteristic offers the advantage of being a simple construct for producing steam.

According to yet another characteristic of the invention, the steam outlet holes are arranged in a soleplate of an iron with a heel on which it can stand during the inactive phases of an ironing session.

According to another characteristic of the invention, the flash boiling chamber is connected to the mineral deposit collection cavity by an opening made in the back end of the boiling chamber, the flow of steam produced by the boiling chamber exiting through the steam conduit via the opening in the back of the boiling chamber.

According to another characteristic of the invention, the mineral deposit removal orifice leads out to the heel of the iron.

Such a characteristic offers the advantage of providing excellent access to the mineral deposit removal orifice when the iron is resting on its soleplate.

According to another characteristic of the invention, the mineral deposit collection cavity is positioned askew, behind the soleplate when the iron is resting on its soleplate.

Such a characteristic makes it possible to distance the mineral deposit collection cavity from the soleplate and therefore to reduce the risk of burn when handling the plug.

BRIEF DESCRIPTION OF THE DRAWINGS

The objectives, appearances and advantages of this invention will be better understood according to the description provided below of one particular method of implementing the invention, offered as a non-limiting example, in reference to the attached drawings, in which.

DETAILED DESCRIPTION OF THE INVENTION

Only the components necessary to understand the invention have been depicted. To make it easier to read the drawings, the same components are labeled with the same reference numbers from one drawing to another.

Figure 1:
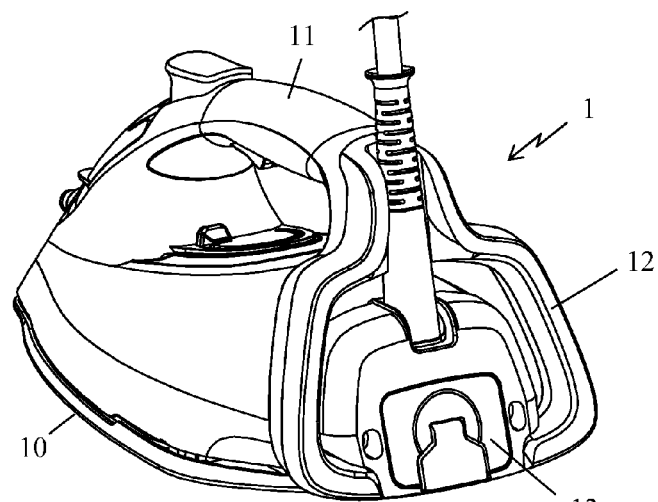
FIG. 1 is a perspective view of an iron according to one particular method of implementing the invention.

FIG. 1 depicts a steam iron (1) with a soleplate (10) equipped with a set of steam outlet holes (10A), which are visible only in FIG. 2, the soleplate (10) being assembled below a plastic casing that has a handle (11) on its upper end and a heel (12) on its back part, on which the iron can stand essentially vertically during the inactive phases of an ironing session.

Figure 2:
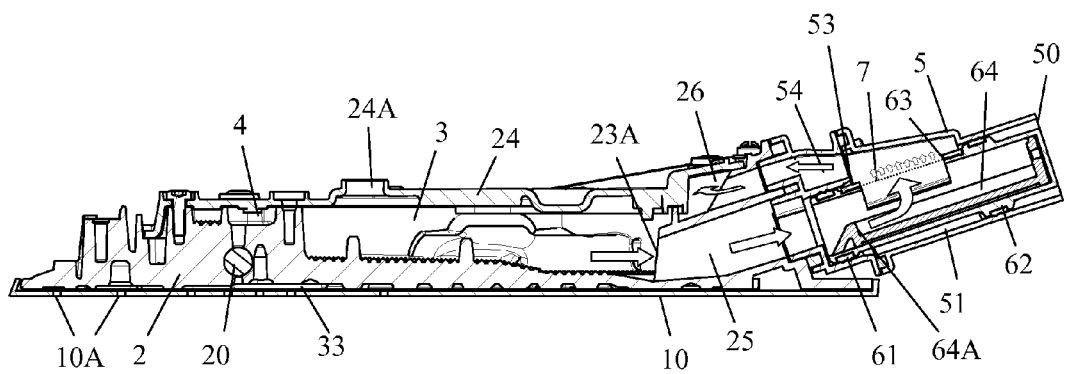
FIG. 2 is a longitudinal cross-section view of the heating body and of the soleplate with which the iron in FIG. 1 is equipped.

The heel (12) has two arms, between which there is a space for a detachable plug (13) providing access to a mineral deposit removal orifice (50), which is visible in FIG. 2, the plug (13) being attached to one back surface of the casing by a bayonet-style fitting similar to the one described in greater detail in patent application FR 2 981 371 submitted by the applicant, the back surface of the casing being inclined slightly forward in order to provide easier access when the iron is resting horizontally on its soleplate (10).

Figure 3:
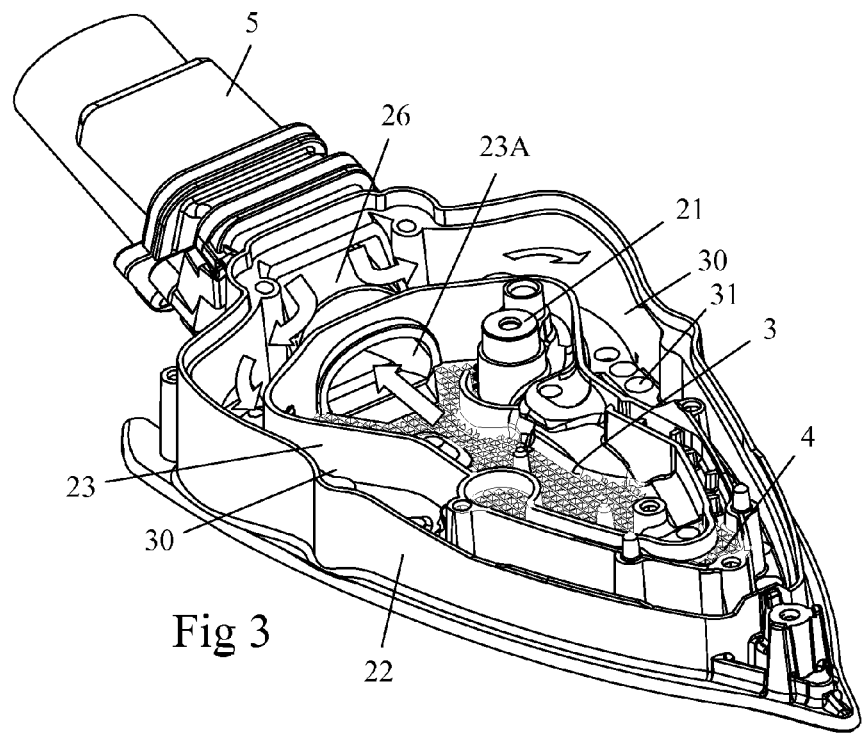
FIG. 3 is a perspective view of the heating body in FIG. 2 with its closure cap removed.
Figure 4:
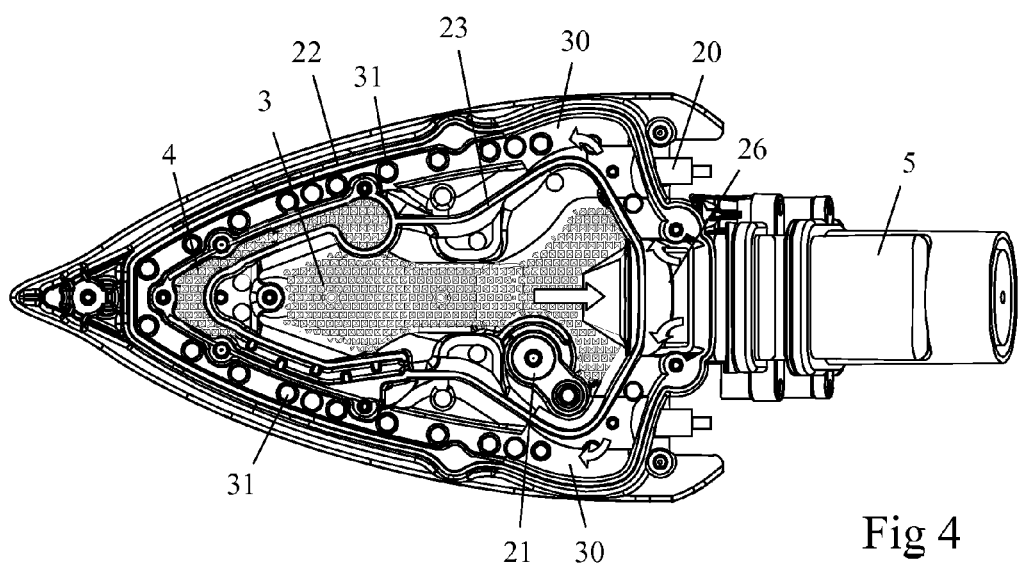
FIG. 4 is a view from above of the heating body in FIG. 2.

As shown in FIGS. 2 through 4, the soleplate (10) of the iron is thermally and mechanically connected to a heating body (2) included in the lower portion of the casing, the heating body (2) being cast of aluminum, including the usual resistance element (20) bent into a horseshoe shape and a boss (21), which is visible in FIG. 3, provided to accommodate a thermostat for regulating the temperature of the soleplate (10).

The heating body (2) has a peripheral wall (22) that defines the sides of a space containing a main boiling chamber (3) and an extra steam chamber (4), of the flash boiling type, with a bottom having many pyramid-shaped contacts to increase the heat exchange surface.

The boiling chamber (3) is positioned in the center of the heating body (2) and is connected to the steam outlet holes of the soleplate (10) by a steam conduit containing two lateral channels (30) extending on either side of the boiling chamber (3) and coming together at the forward end and at the back end of the heating body (2), the lateral channels (30) having the usual orifices (31) crossing the heating body (2) to lead out to the lower surface of the heating body, to steam conduit cavities (33), which are visible in FIG. 2, positioned to face the steam outlet holes (10A) of the soleplate.

Figure 5:
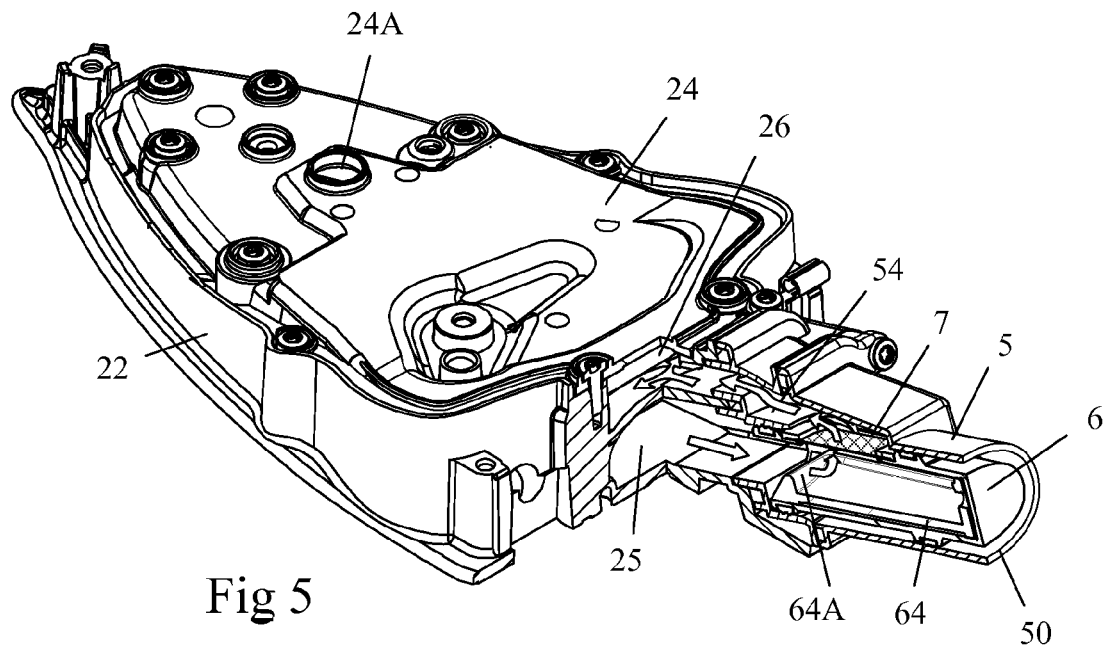
FIGS. 5 and 6 are perspective views, partially pulled out, of the heating body in FIG. 2, with and without the mineral deposit collection container, respectively.

As shown in FIGS. 2 and 5, the heating body (2) also has a closure plate (24) that rests on the upper edge of the peripheral wall (22), this closure plate (24) being mounted below a water reservoir, which is not shown in the drawings, contained in the casing of the iron, supplying water to the boiling chamber (3) via an orifice (24A) of the closure plate (24) receiving, by its very nature, a droplet valve, not shown in the drawings, producing a continuous output of steam on the order of 40 to 70 gr/min.

The sides of the main boiling chamber (3) are defined by a partition (23) that extends up to the cover plate (24), while being attached in an airtight manner to the latter, such that the steam produced in the boiling chamber (3) can escape only through an opening (23A) placed in the partition (23) at the back end of the boiling chamber (3).

As shown in FIG. 2, the opening (23A) in the partition leads to a conduit (25), the cross-section of which is roughly oblong, made in the casting of the heating body (2), this conduit (25) extending obliquely with respect to the plane of the soleplate (10), creating about a 20° angle, and being extended by a catch basin (5) made of plastic, for example of the PPS (polyphenylene sulfide) type, included in the casing of the iron (1).

The catch basin (5) contains a cavity (51) for collecting the mineral deposits, extending axially in the extension of the conduit (25) and leading out to the heel (12) of the iron, at the mineral deposit removal orifice (50) closed by the plug (13), the cavity (51) being positioned askew behind the soleplate (10) when the iron is resting on its soleplate (10) and having an oblong cross-section.

Figure 6:
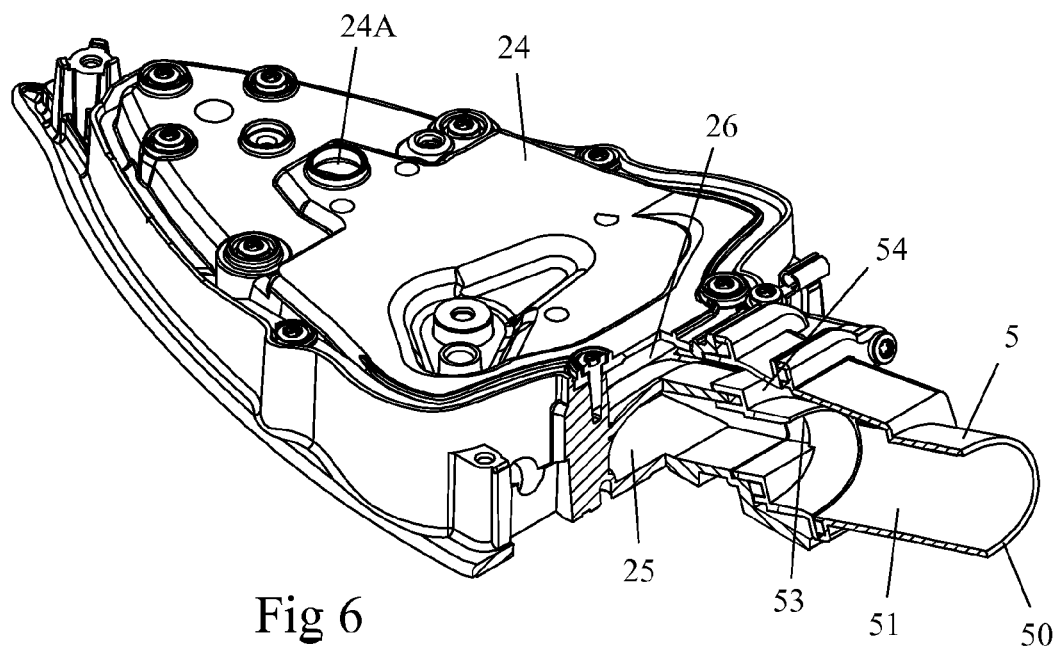

As shown in FIGS. 2 and 6, the catch basin (5) has a release opening (53) in the upper part of the mineral deposit collection cavity (51), this release opening (53) leading out into the return channel (54) extending above the conduit (25) and leading out into a distribution chamber (26) positioned at the input of the two lateral channels (30).

Figure 7:
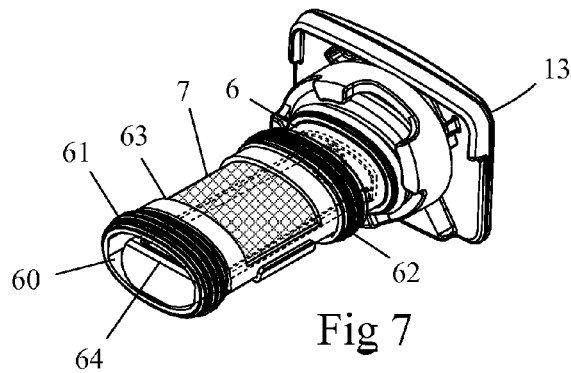
FIG. 7 is a perspective view of the mineral deposit collection container attached to the plug with which the iron in FIG. 1 is equipped.

As depicted in FIGS. 5 and 7, the mineral deposit collection cavity (51) receives a detachable mineral deposit collection container (6) in the complementary shape of the mineral deposit collection cavity (51), and the mineral deposit collection container (6) can be removed from or inserted into the cavity (51) through the mineral deposit removal orifice (50). The container (6) has an open front end (60) through which the steam flow emitted from the boiling chamber (3) is allowed to pass into the container (6) and a closed back end, ideally attached to the plug (13), as depicted in FIG. 7, the container (6) having a lower part equipped with a mineral deposit holding bowl (64) with a hollowed part in which the mineral particles are stored, the front end of the bowl having a step (64A) that prevents gravity from returning the mineral particles collected in the bowl (64) to the boiling chamber when the iron (1) is sitting on its soleplate (10).

The container (6) is preferably made of plastic, of the PA 6-6 polyamide type, reinforced with 30% fiberglass, and supports a first and second silicone seal (61, 62) that come into contact with the lower wall of the mineral deposit collection cavity (51), the container (6) having, between the two seals (61, 62), an opening placed in the upper half of the container (6) forming a side window (63) that faces the release opening (53) of the mineral deposit collection cavity (51) when the container (6) is fully inserted into the cavity (51).

As shown in FIG. 7, the mineral deposit collection container (6) has a filter (7) made of a domed filtration screen extending through the window (63), this filter screen (7) being attached at the edge of the window and being ideally covered in an non-stick coating made of PTFE (polytetrafluoroethylene). Preferably, the mineral deposit collection container (6) is overmolded on the edge of the filter screen (7) to ensure the perfect attachment of the screen (7) to the container (6).

The filter screen (7) has openings that are calibrated to retain the largest mineral particles and is of the appropriate size to provide a section large enough for the required steam output to pass through. For example, the screen (7) may have square openings of less than 0.4 mm on a side, and preferably somewhere between 0.1 mm and 0.4 mm, the surface of the screen being at least 8 cm$^2$ for square openings of 0.2 mm and an expected steam output on the order of 40 to 50 gr/min. The screen (7) will ideally be made of stainless steel wire that is 0.1 mm in diameter or of glass cloth made from a woven thread that is 1 mm in diameter.

Preferably, the window (63) receiving the screen (7) is set back from the open front end (60) such that the screen (7) is far enough away from the boiling chamber (3) so that the boiling water in the boiling chamber (3) does not splash up and soil the filter screen (7). In addition, the position of the screen (7) high above the container (6), when the iron is resting on its soleplate (10), prevents it from being soiled by any water that might make its way into the cavity (51) due to the incomplete boiling of the water injected into the boiling chamber (3) during an ironing session.

The distance of the filter screen (7) away from the boiling chamber (3), as well as the use of plastic materials for the catch basin (5) and the container (6), also offer the advantage of obtaining a relatively low temperature around the screen (7), of around 100° C., thus avoiding a strong boil in any water that may make its way into the container area (6) located under the screen (7).

Preferably, the window (63) is also distanced from the back end of the container (6) such that it creates a storage space on the order of 4 to 5 cm$^3$ in the portion of the container (6) located between the bottom of the container (6) and the screen (7), into which the mineral particles fall when the iron (1) is sitting vertically on its heel (12).

The flow of steam in the iron (1) thus created will now be described.

When the water from the droplet valve comes into contact with the bottom of the boiling chamber (3), it vaporizes instantly, which causes the release of steam, indicated by the arrows in FIGS. 2 through 5, which escapes through the opening (23A) in the partition (23) and then flows, successively, through the outlet conduit (25), the container (6), the screen (7), the return channel (54) and the side channels (30), the steam flow then crossing the orifices (31) to come out at the bottom surface of the soleplate (10) and then exiting through the outlet holes (10A) in the soleplate.

The evaporation of the water causes the formation of a layer of calcium carbonate on the bottom of the boiling chamber (3), which gradually disintegrates into small mineral particles as an effect of the expansion and contraction of the heating body (2) during cooling phases between two ironing sessions.

The mineral particles present in the boiling chamber (3) are gradually carried by the flow of steam into the conduit (25) and a portion of them, due to their inertia, are propelled to the bottom of the mineral deposit collection container (6), where they are trapped, such that gravity pulls them into the bowl (64) and a portion of them are propelled toward the screen (7).

This inertia-based separation of the mineral particles occurs in particular due to the roughly 90° turn that the steam must make as it enters the screen (7).

The mineral particles move toward the container (6) also due to gravity each time the iron (1) is placed on its heel (12), the storage space provided in the bottom of the container (6) being designed to receive the mineral particles, potentially accompanied by droplets of water, without said water droplets coming into contact with the screen (7), thus preventing the screen (7) from getting soiled.

The mineral particles that are carried by the flow of steam toward the screen (7), and that are of a larger size than the openings in the screen (7), are trapped under the screen (7), and only the finest mineral particles, which are practically invisible to the naked eye, can pass through the screen (7) and escape through the steam outlet holes in the soleplate (10).

When the steam stops, gravity causes most of the particles trapped by the screen (7) to fall into the bowl (64) of the container (6), but a few particles may nevertheless remain stuck to the screen (7) and contribute to its gradual clogging, while the screen (7) will also develop scaling due to the evaporation of any water droplets that come into contact with the screen (7).

When it becomes necessary to clean the iron (1), which will occur after several steam ironing sessions, or when an indicator light illuminates on the iron, the user can easily remove most of the mineral deposits present in the iron by placing the iron (1) horizontally on its soleplate (10), in order to easily access the plug (13), and by taking the collection container (6) out of the cavity (51) by unlocking the plug (13) and moving it toward the back, so as to slide the container (6) axially through the mineral deposit removal orifice (50).

During this container (6) removal step, the mineral deposits remain in the bowl (64) due to its hollowed-out shape and due to the existence of the step (64A) near the front end of the bowl.

The contents of the container (6) can then be emptied and the container (6) can be cleaned by rinsing under running water. During this mineral deposit removal procedure, the use has a direct line of sight to inspect the condition of the filter screen (7), such that he can immediately see how clean or dirty it is. If he deems it necessary, he may clean the screen (7) by scrubbing it under water with a brush or by submerging it in a descaling liquid.

The iron thus created therefore offers the advantage of providing very good mineral particle filtration, due to the presence of the filter screen, thus preventing any visible discharge of mineral particles onto the fabric.

In addition, the iron makes it easy to remove the mineral particles accumulated in the mineral deposit collection container, such that it can easily be kept clean to promote the optimal functioning of the iron.

In particular, the iron thus created offers the advantage of enabling the user to conduct a direct visual inspection of how clogged the filter screen is when removing the mineral deposit collection container, such that the user can immediately assess, while performing this procedure, whether or not it is necessary to clean the filter screen.

Of course, the invention is in no way limited to the methods of implementation described and illustrated above, which are provided only as examples. Modifications remain possible, particularly with regard to the constitution of the various components or by substituting equivalent techniques, without necessarily falling outside the scope of protection of the invention.

Thus, in one variation of implementation that is not depicted, the mineral deposit collection container may not be attached to the plug, but has a handle on its back end that allows the user to manually grab hold of it after removing the plug.

Thus, in one variation of implementation that is not depicted, the filter screen may be mounted in a detachable way on the mineral deposit collection container, such that the filter screen can be changed as needed.

Thus, in one variation of implementation that is not depicted, the iron may have a series of different filters with increasingly fine filtration mesh. At least a portion of these filters, and ideally the filters with the finest mesh, will be positioned on the mineral deposit collection container, to allow for easy cleaning of the filters that become clogged most quickly. However, the iron may also have additional filters that are not detachable, inside the iron, downstream of the detachable filters.

Thus, in one variation of implementation that is not depicted, the boiling chamber may be thermally separated from the soleplate, and the latter may have its own heating element.

The invention claimed is:

1. Iron containing a steam generator connected to steam outlet holes by a steam conduit with at least one filter intended to retain mineral particles carried by a flow of steam, wherein said steam conduit has one mineral deposit collection cavity with a mineral deposit removal orifice closed by a detachable plug that is accessible from outside the iron, and in that said filter can be detached from the iron through the mineral deposit removal orifice,
   wherein the iron has a mineral collection container that is inserted into the mineral deposit collection cavity through the mineral deposit removal orifice.

2. Iron described in claim 1, wherein the filter is attached to the plug.

3. Iron described in claim 1, wherein the filter is comprised of a screen with openings that are smaller than 0.4 mm on a side.

4. Iron described in claim 1, wherein the steam traveling through the steam conduit flows from bottom to top through the filter, and wherein the mineral deposit collection cavity is positioned upstream of the filter.

5. Iron described in claim 1, wherein the filter is positioned in a portion of the steam conduit where the flow of steam makes at least a 90° turn.

6. Iron described in claim 1, wherein the filter has a domed shape.

7. Iron described in claim 1, wherein the mineral deposit collection container has one open front end through which the steam enters, and one closed back end, the collection container having a side window through which the steam escapes in the direction of the steam outlet holes and wherein said filter extends through said window.

8. Iron described in claim 7, wherein the mineral deposit collection container supports an airtight seal that comes into contact with the mineral deposit collection cavity on either side of the window.

9. Iron described in claim 7, wherein the window is oriented upward when the mineral deposit collection container is placed in the mineral deposit collection cavity when the iron is in a normal operating position, the mineral deposit collection container having in the wall opposite the window, a bowl with a hollowed portion.

10. Iron described in claim 7, wherein the container has at least one portion extending behind the filter, defining a storage area that is larger than 4 cm$^3$.

11. Iron described in claim 1, wherein the steam generator is a flash boiling chamber.

12. Iron described in claim 11, wherein the steam outlet holes are made in a soleplate of an iron with a heel on which it can stand during the inactive phases of an ironing session.

13. Iron described in claim 12, wherein the flash boiling chamber is connected to the mineral deposit collection cavity by an opening made in an end of the boiling chamber, the steam produced by the boiling chamber escaping through the steam conduit via said opening.

14. Iron described in claim 12, wherein the mineral deposit removal orifice extends out to the heel of the iron.

15. Iron described in claim 12, wherein the mineral deposit collection cavity is positioned askew behind the soleplate when the iron is resting on its soleplate.

* * * * *